UNITED STATES PATENT OFFICE.

PHILIPP STRELITZ, OF BERLIN, PRUSSIA.

IMPROVEMENT IN COMPOUNDS FOR PREVENTING RADIATION OF HEAT.

Specification forming part of Letters Patent No. 210,060, dated November 19, 1878; application filed October 26, 1878.

*To all whom it may concern:*

Be it known that I, PHILIPP STRELITZ, residing at Berlin, Prussia, have invented a new and Improved Composition for Preventing the Radiation of Heat, of which the following is a specification:

The present invention relates to improvements in that class of compounds which are employed for covering steam-boilers, steam-pipes, cylinders, heaters, and other devices or heated surfaces in general, where it is desirable to prevent the radiation of heat.

The invention consists in a compound prepared as hereinafter more fully described, and set forth in the claim.

In preparing my compound, I take twenty-six parts of infusorial earth, which is subjected to the action of a washing-machine for the purpose of removing the sand and vegetable fibers mixed with said earth. The cleaned or washed infusorial earth is then dried and is pulverized or triturated in a mill.

The infusorial earth is the chief or essential ingredient of my compound, and I may state that said earth is homogeneous, has a low specific gravity and great absorbent capacity, thus rendering it particularly adapted for use in a boiler-covering compound.

With the infusorial earth I combine the following substances in the proportions specified, viz: rye-meal, four parts; coal-tar, four parts; animal-hair, two parts; cotton-seed hulls, five parts; and water, sixty parts. The coal-tar is heated or cooked, so as to remove its watery constituents, and the animal-hair is subjected to the action of a devil or picking-machine, and freed from sand and other foreign substances by sifting. The cotton-seed hulls are cooked before they enter the compound.

The different materials treated as above stated are intimately mixed in a suitable mixing-machine, and I may observe that the coal-tar and cotton-seed hulls are added to the other materials while they are in a cooking state. When the materials have been sufficiently mixed the mass is placed in a suitable room and submitted to a certain temperature, so as to cause fermentation, the result of which is a homogeneous self-adhesive compound. The mass is applied to steam-boilers, pipes, and other heated surfaces, and as it hardens it will firmly adhere to the surface to which it is applied. It will adhere in such firm manner that vibrations or jars will not cause it to drop off, and for this reason it can be used on locomotives and steam-hammers. The infusorial earth being of a very absorbent nature, all moisture forming on the surface of the pipe or covered surface is readily absorbed or taken up, and thus I prevent corrosion in a perfect and satisfactory manner. The lightness of the compound prepared as herein described renders it admirably adapted for covering long pipes or heat-conductors, as there is comparatively little weight on said pipes.

I am aware that earthy and calcareous matters have been combined with binding substances and cementing materials, so as to form boiler-covering compounds, and also that mineral and vegetable matters have been combined and prepared for use by fermentation.

I disclaim all broadness of invention in the particulars specified; but

What I do claim, and desire to secure by Letters Patent, is—

The compound herein described, for the purpose specified, consisting of infusorial earth, rye-meal, coal-tar, animal-hair, cotton-seed hulls, and water, in or about the proportions specified.

In testimony whereof I have signed my name to this specification in the presence of two subscribing witnesses.

PHILIPP STRELITZ.

Witnesses:
GERARD V. NAWROCKI,
BERTHOLD ROI.